United States Patent
Singhal

(10) Patent No.: US 9,158,763 B1
(45) Date of Patent: Oct. 13, 2015

(54) CATALOGING STORAGE ARRAYS

(75) Inventor: Upanshu Singhal, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 333 days.

(21) Appl. No.: 13/436,614

(22) Filed: Mar. 30, 2012

(51) Int. Cl.
  *G06F 17/30* (2006.01)
  *G06F 11/14* (2006.01)

(52) U.S. Cl.
  CPC .......... *G06F 17/30* (2013.01); *G06F 11/1464* (2013.01)

(58) Field of Classification Search
  CPC ...................................... G06F 17/30
  USPC ........................................ 707/639
  See application file for complete search history.

(56) References Cited

U.S. PATENT DOCUMENTS

| | | | |
|---|---|---|---|
| 2004/0250033 A1* | 12/2004 | Prahlad et al. | 711/162 |
| 2008/0244028 A1* | 10/2008 | Le et al. | 709/208 |

* cited by examiner

*Primary Examiner* — Mariela Reyes
*Assistant Examiner* — Mohsen Almani
(74) *Attorney, Agent, or Firm* — Staniford Tomita LLP

(57) ABSTRACT

This disclosure relates to a method and a system for cataloging storage arrays and devices. Exemplary systems create, update, and store indexes, and also provide a search facility to search indexed information. Cataloging creates, stores and updates indexes of all the configuration of a storage array or device, as well as snapshots of applications. Exemplary methods comprise identifying a storage array, conducting a storage discovery, obtaining a complete storage array information, and creating an index.

20 Claims, 5 Drawing Sheets

CATALOGING STORAGE ARRAYS

FIELD

This invention relates generally to storage arrays and devices, and more particularly to cataloging storage arrays and devices.

BACKGROUND

A storage array or device contains a lot of information regarding a storage environment, which is comprised of a variety of components including hardware, software applications, and services. For example, the storage array may contain a huge number of snapshots, clone Logical Unit Numbers (LUNs), production or source LUNs, Business Continuance Volume (BCV), standard volumes, and other information. As a result, cataloging this large amount of information can both be time consuming and impact performance of the storage array. For example, a user currently needs to use storage Command Line Interface (CLI) or User Interface (UI) to browse snapshots, BCV/standard volumes, and clone LUNs. This manual process is very labor intensive, time-consuming and the information browsed is likely to be lost. This information, nevertheless, is necessary for backup, recovery and archiving (BURA), for storage migration to a new storage array from an old storage array, for identifying storage array configuration issues, and for optimizing performance of storage arrays and devices.

There is a need, therefore, for an improved method or system for cataloging storage arrays and devices.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1A:
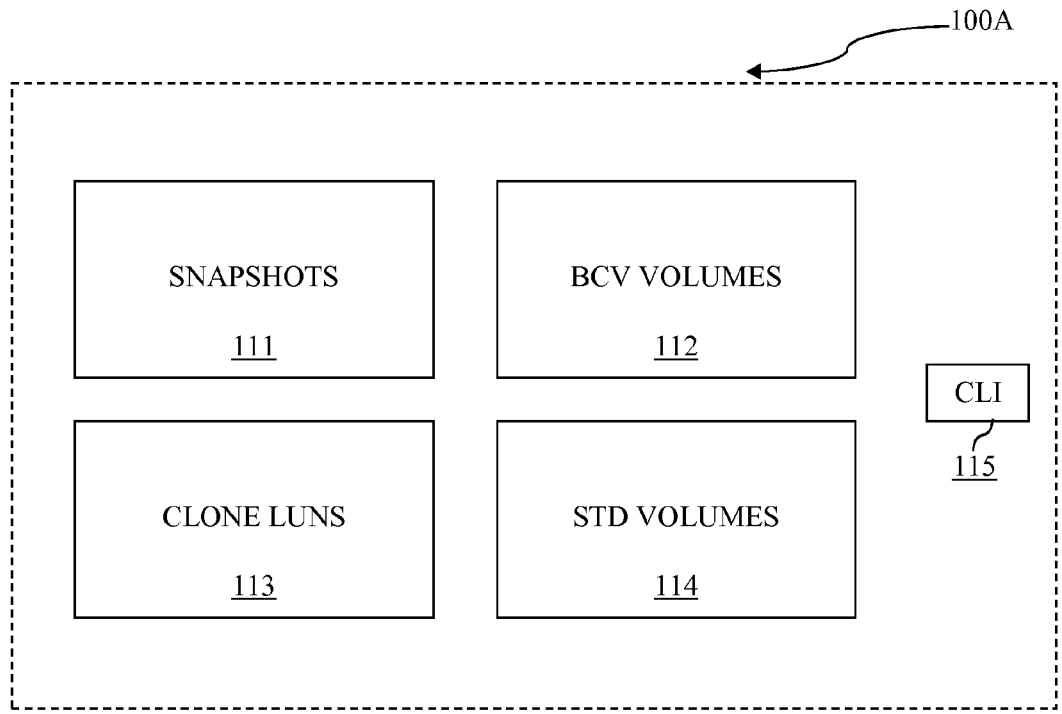
FIG. 1A depicts an example of a storage array or device having a Command Line Interface (CLI)

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

The principles of the present invention relate to a method and a system configured for cataloging storage arrays and devices. Cataloging creates, stores, and updates indexes of all the configuration of a storage array or device, as well as snapshots of applications. Stored indexed information can be used for backup, recovery and archiving (BURA), for storage migration to a new storage array from an old storage array, and for restore. The method and the system can also be used for identifying storage array configuration issues, and for optimizing performances of storage arrays.

Exemplary systems include a system, or an application residing on a host computer and a volume configured for continually storing changes that occur in the application. Each time, data is written by the application, the volume is triggered and a copy of data involved in the read/write operation is created and stored on the volume. The volume is able to retain all cataloged information the application creates. The system or the application can catalog storage arrays and devices. The system or the application can create and store indexed information of storage arrays and devices over a long period of time. A user can use the system, or the application and the volume to access indexed information of storage arrays and devices. The system and the application with the volume also provide a user with a search facility which allows the user to search for any indexed information.

Indexed information comprises snapshots, clone LUNs, BCV Volumes, STD volumes. Snapshots are read-only point-in-time replicas or representations of the original data or contents of one or more volumes. A snapshot can be used to make an actual copy on another local or remote storage array and device. The snapshots can be recovered at a later time by reading the data for a snapshot created at a particular point in time. Furthermore, numerous snapshots can be created and saved. Thus, snapshots provide users with greater control over how data is stored and/or recovered.

Clone LUNs are LUNs participating in any Clone Group as associated with a source LUN. An LUN is a number to identify a logical unit, which is a device addressed by the Small Computer System Interface (SCSI) protocol or similar protocols such as Fibre Channel or Internet Small Computer Interface (iSCSI). Often times, "LUN" is also used to refer to the actual drive itself. A clone is a complete copy of a source LUN. A source LUN is specified when a Clone Group is created. The copy of the source LUN begins when a clone LUN is added to the Clone Group. Each clone is assigned with a clone identification (ID). This clone ID remains with the clone until it is removed from the Clone Group. Clone LUN creates a complete copy of the LUN and frees the snapshots. Any writing requests made to the source LUN are simultaneously copied to the clone. Usually, the clone LUN and the source LUN belong to the same Clone Group. Clone LUN can be detached from the source LUN at a point in time and mounted on production or non-critical server to facilitate offline backup or parallel processing. Thus, clone LUNs also provide users with greater control over how data is stored and/or recovered.

BCV volumes are business continuance volumes that use advanced mirroring technique for business continuity purposes. BCV volume is an independently addressable copy of a data volume. BCVs can be detached from the active data storage at a point in time and mounted on non-critical servers to facilitate offline backup or parallel processing. There are two types of BCV volumes: a clone BCV and a mirrored BCV. A BCV uses one-to-one separate physical storage. STD volumes are active application volumes containing a production file system (production data and programs). An STD volume is a local volume on which the production file system can be built on. Usually, STD volumes are sized to store the largest file systems. BCV volumes and STD volumes provide users with information to evaluate and to optimize performance of storage arrays and devices. Also, BCV volumes and STD volumes are needed in BURA and migration operations.

As used herein, the term "cataloging" covers various processes for creating indexes of all the configuration of the given array as well as snapshots of applications, for storing and updating indexes, and for providing a search facility. One example of cataloging includes creating, storing, and updating indexes comprising array serial number, array model number, array software information, Redundant Array of Independent Disks (RAID) groups, Storage Groups, configured LUNs, configured SAN copy sessions, and configured Clone Groups. One example of cataloging includes creating, storing, and updating indexes comprising a snapshot of an application.

Cataloging storage arrays and devices are beneficial, for example, to facilitate data recovery after occurrence of a disaster. A disaster includes any event in which data is lost or corrupted in any way, or when an operating system or other application is corrupted or damaged in any way that requires the operating system or application to be repaired or reinstalled. Data can be lost, damaged, or corrupted in many ways, such as a system crash, burglary, virus, human error, and damage to the system, etc. Indexes created during cataloging are stored on a medium, such as an optical disk, hard disk, floppy disk, tape, or any other storage medium that is physically stored in a location separate from the storage array and assessed to recover the application or the storage array after the storage array experiences a disaster. Hence, during recovery, performance of a storage array will be improved by taking away the load from the storage array.

As used herein, the term "data" may include, but is not limited to, directories (e.g., volumes, and file systems), user data, system data, applications, services, and operating systems, etc; that can be stored on one or more storage arrays and/or storage devices. As used herein, the term "operation time" refers to a time period it takes for a system, in accordance with an example embodiment, to complete an operation of a method, in accordance with an example embodiment, every time when the method operates; namely, the time period from the processor of the system starts to process a method till the processor finishes processing the method every time when the method operates.

Figure 1B:
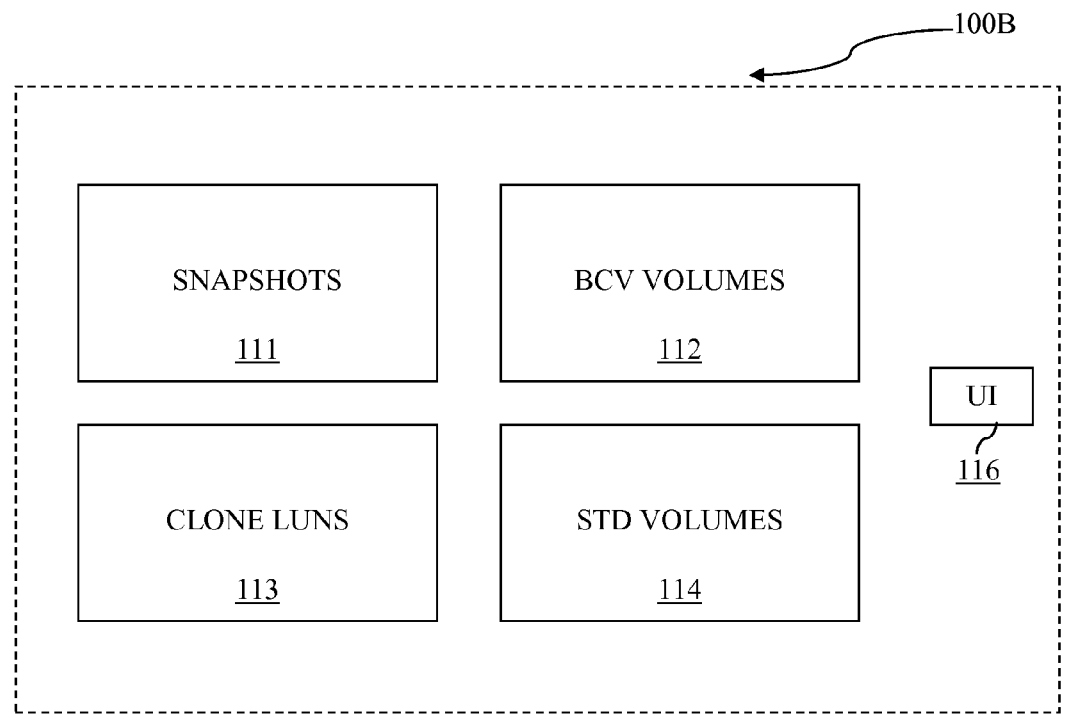
FIG. 1B depicts an example of a storage array or device having a User Interface (UI)

A storage array or device stores a large amount of information of different components in a storage environment. FIG. 1A illustrates a storage array or device 100A having a CLI 115. The storage array or device 100A stores a huge number of snapshots 111, BCV Volumes 112, Clone LUNs 113, STD Volumes 114, along with other information. FIG. 1B illustrates a storage array or device 100B having a UI 116. The UI 116 may be java based. The storage array or device 100B stores a huge number of snapshots 111, BCV Volumes 112, Clone LUNs 113, STD Volumes 114, along with other information. A user can use CLI 115 or UI 116 to look into the storage array 100A or 100B. However, the storage arrays 100A and 100B do not provide the user with an interface to search the stored information comprising snapshots 111, BCV Volumes 112, Clone LUNs 113, and STD Volumes 114. As a consequence, it is quite difficult and time consuming to search the stored information of a storage array for any specific information without this interface.

Figure 1C:
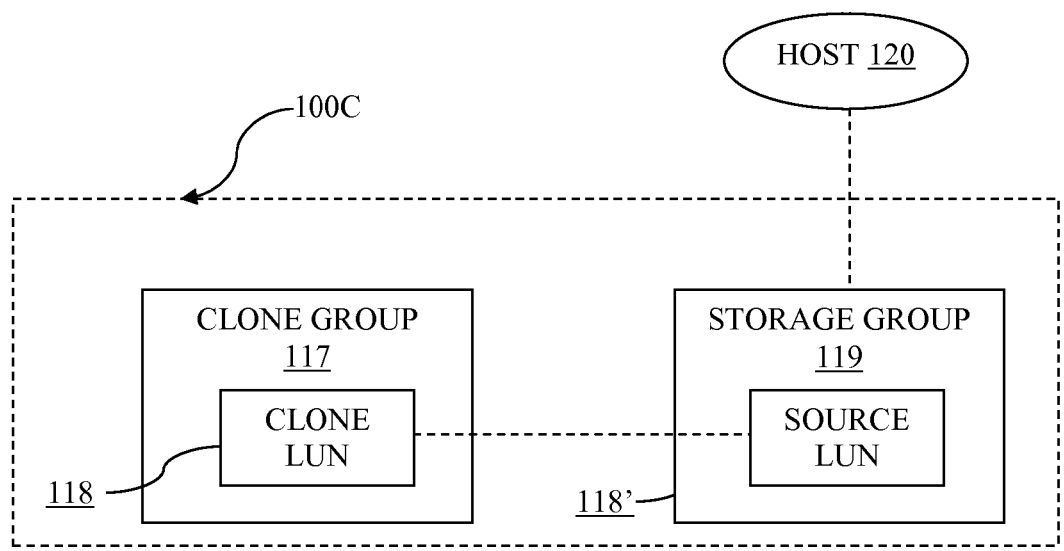
FIG. 1C illustrates an example of a storage array or device.

FIG. 1C illustrates a storage array or device 100C and demonstrates the complexity for a user to locate Clone LUN 118. The storage array 100C can be either the storage array 100A having a CLI 115 or the storage array 100B having a UI 116. The storage array 100C comprises a Clone LUN 118, a Source LUN 118', a Clone Group 117, and a Storage Group 119. The Clone LUN 118 is the clone of the Source LUN 118'. The Clone LUN 118 belongs to the Clone Group 117, and the Source LUN 118' is assigned to the Storage Group 119. The Storage Group 119 is associated with the Host 120. The Clone LUN 118 is one of many clone LUNs configured in the Clone Group 117, which is a portion of all the information stored in the storage array 110A/B/C. For example, if the user needs to find the clone information for the clone LUN 118, the user needs to browse all the clones configured in the Clone Group 117 by using the LUN name and the associated Clone Group name in order to track the clone information. The user must remember all the information for the Source LUN 118', the Host 120, and the Storage Group 117 in order to find the clone information for the Clone LUN 118.

Further, in some cases, a user is unable to find information on a storage array. For example, when the storage array is EMC Symmetrix, a product available from EMC Corporation, there is a VCM database that resides on the front end port of the storage array or on the fabric switch. This VCM database stores information of all hosts that are connected to the storage array. If the VCM database is reset by accident, then all the hosts connected to that front end port or the fabric switch will lose the device configuration to the storage array. Basically, the configuration between the Host 120 and the Storage Group 119 as illustrated in FIG. 1C will be lost, and the user will be unable to locate the clone information for the Clone LUN 118.

Figure 2:
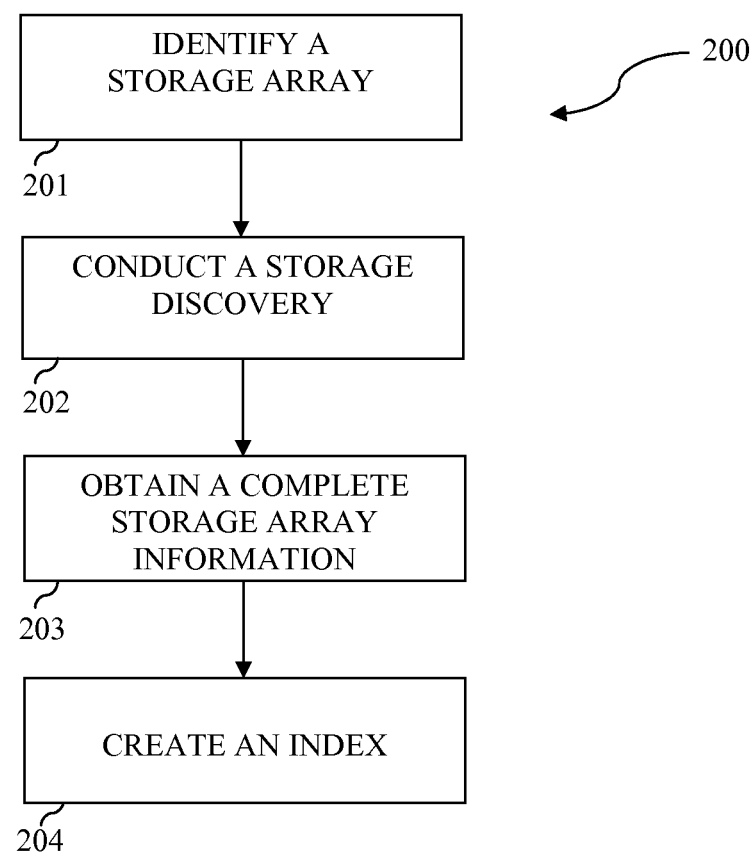
FIG. 2 depicts a flow chart of a method, in accordance with an example embodiment, for cataloging a storage array or device.

FIG. 2 depicts a flow chart of a method 200, in accordance with an example embodiment, for cataloging a storage array or device. At 201, the method identifies a storage array or device for cataloging. A user or a software application may define the storage array or device to be cataloged. At 202, the method conducts a storage discovery on the identified storage array or device. The method obtains information about the storage array or device, which comprises the serial number of the storage array, all the Storage Group configured on the storage array, all the Hosts configured on the storage array, RAID Groups configured on the storage array, all the Clone LUNs information on the storage array, all the Source LUNs information on the storage array, all the snapshots information on the storage array, all the license information on the storage array, all the volume information on the storage array, and all the disks information on the storage array, etc.

For the example of EMC CLARiiON, a product available from EMC Corporation, the storage discovery will acquire the information comprising CLARiiON serial number, IP address(es) of its Storage Processors (SPs), all the disks information, all the Storage Groups configured, all the Hosts configured, RAID Groups configured, all LUNs information, all SnapView Clone information, all SnapView Snapshot information, all the license information, all the disks information, and all the volume information, etc. For the example of EMC Symmetrix, a product available from EMC Corporation, the storage discovery will obtain the information comprising Symmetrix serial number, all the disks information, all the Hosts configured, RAID Groups configured, all STD LUNs information, all BCV LUNs information, all vDev Snapshots information, all the license information, all the disks information, all the volume information, and all the information about the EMC Symmetrix's connection to any remote arrays, etc.

The method may use the storage array interface CLI or UI to conduct the storage discovery. The storage discovery can be conducted via a command. For example, "Symcfg discovery-clar" for EMC CLARiiON, a product available from EMC Corporation, and "Symcfg discovery" for EMC Symmetrix, a product available from EMC Corporation. The storage discovery can also be conducted using StorAPIs, which is the same interface for EMC CLARiiON and EMC Symmetrix. Usually, the method creates or updates a configuration database file during the storage discovery at 202.

Subsequent to 201 when the storage array is identified and prior to step 202 when the storage discovery is performed, the method may need to establish a connection with the storage processor(s) of the storage array. The method provides the credentials comprising a username, a password, and a group to the storage array for access. When there are more than one storage processors in a storage array, usually the credentials are the same. For example, EMC CLARiiON, a product available from EMC Corporation, can be accessed only via IP using CLI or web based GUI. To access EMC CLARiiON, credentials such as username, password and group need to be provided. These credentials are required to connect to EMC CLARiiON.

At 203, the method obtains a complete storage array information. The complete storage array information comprises the serial number of the storage array, all the Storage Group configured on the storage array, all the Hosts configured on the storage array, RAID Groups configured on the storage array, all the Clone LUNs information on the storage array, all the Source LUNs information on the storage array, all the snapshots information on the storage array, all the license information on the storage array, all the volume information on the storage array, all the disks information on the storage array, and etc.

At 203, the method may obtain the complete storage array information in a form of configuration database file, which may be created or updated at 202. The configuration database file may be a flat file. The configuration database file may also be parsed by the storage array interface CLI or UI.

At 204, the method creates an index of the storage array identified in step 201. The index comprises all the configurations of the storage array. The index comprises the serial number of the storage array, the model number of the storage array, software information of the storage array which comprises SnapView, MirrorView, Access Logix, and SAN Copy, etc; RAID Groups, Storage Groups, configured LUNs which comprises LUN ID, and LUN Size, etc; configured SAN Copy sessions, and configured Clone Groups, etc. Prior to the method creating the index, the method may parse the configuration database file.

The method may update the index on a periodic basis (e.g., every 15 or every 30 minutes.) This cataloging period may be tuned. The cataloging period nevertheless should not be too short, as a high cataloging frequency may impact performance of the storage array. The index created at 204 also comprises backup application indexes which are used in backup recoveries.

Figure 3A:
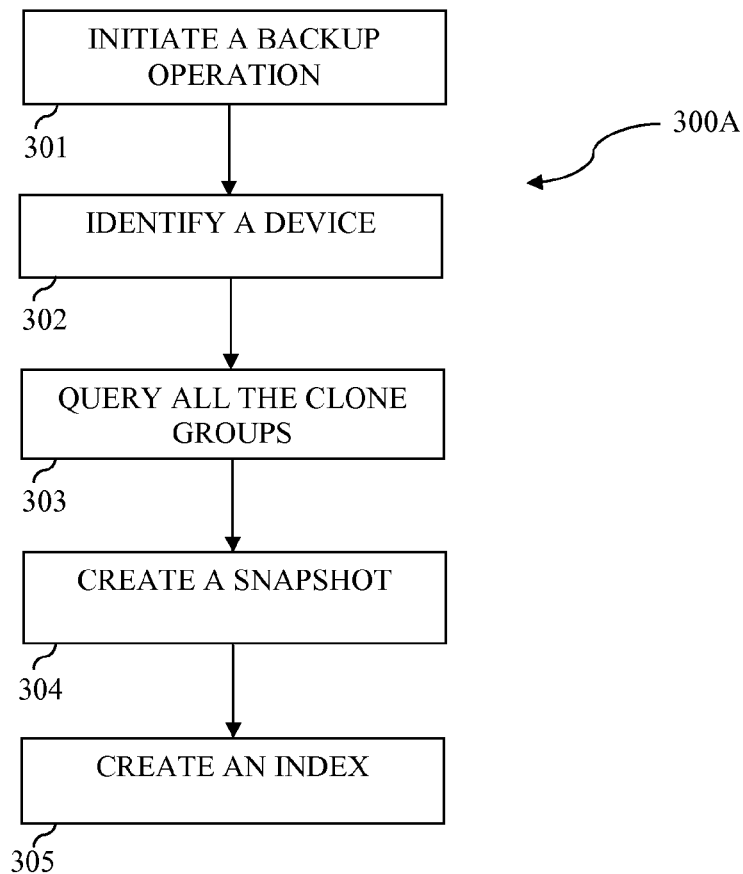
FIG. 3A depicts a flow chart of a method, in accordance with an example embodiment, for cataloging a storage array or device for backup recovery purposes.

FIG. 3A depicts a flow chart of a method 300A, in accordance with an example embodiment, for cataloging a storage array or device for backup recovery purposes. For example, in one embodiment, the method 300 creates a snapshot of an application. At 301, the method initiates a backup operation. At 302, the method identifies a device and determines whether it resides on the storage array identified at 201. In one embodiment, the method queries the storage array catalog for all the Storage Groups and determines whether the Host belongs to any Storage Group. Subsequently, the method searches for the LUNs in the Storage Group using the drive letters or physical drive names for the database and log files.

At 303, the method queries all the Clone Groups configured on the storage array identified in step 201. In one embodiment, the method obtains the Clone Group name using the database, log files, and LUN names. Subsequently, the method queries how many clone LUNs are configured with the device identified at 302. A snapshot is a combination of unchanged data on the source LUN and data on the reserved LUN. The source LUN contains all data that has not been changed since the creation of the snapshot, while the reserved LUN pool contains copies of the data that has been changed on the source LUN. When using snapshots, the reserved LUN pool is very important in that once its disks are full, all active snap sessions that use the pool will immediately terminate. This can be counteracted by adding additional LUNs to the reserved LUN pool. Accordingly, determining how many clone LUNs are configured with the device helps in identifying whether enough clones are configured or not on the storage array as per the number of snapshots to be created for the application in a day.

At 304, the method creates a snapshot using the Clone Group name. At 305, the method creates an index comprising a backup application index and stores the snapshot information in the backup application index. Indexes created at step 204 comprise backup application indexes. If no Clone Group is configured, then the method searches for available space in Reserved LUN Pool for Copy or Write (COW) based snapshot, and creates the snapshot if the space is sufficient. If the space is insufficient, then the method will give a warning that a snapshot cannot be created.

Figure 3B:
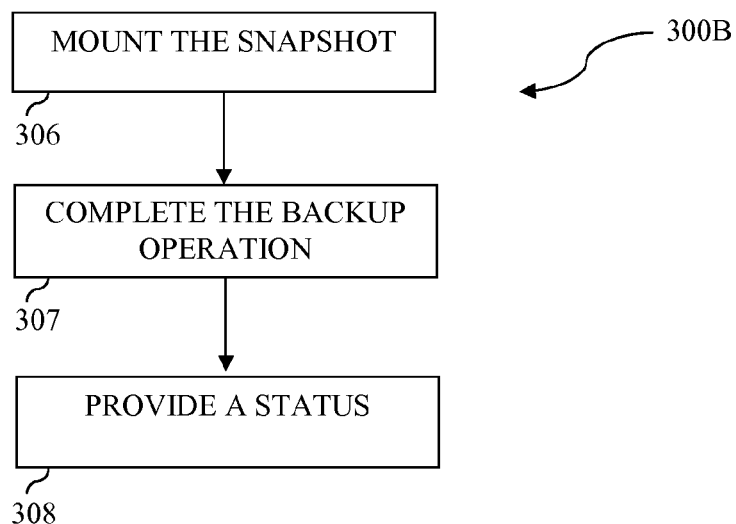
FIG. 3B depicts a flow chart of a method, in accordance with an example embodiment, for cataloging a storage array or device for backup recovery purposes.

FIG. 3B depicts a flow chart of a method 300B, in accordance with an example embodiment, for cataloging a storage array or device for backup recovery purposes. At 306, the method mounts the snapshot for tape backup purpose or data validation. If the mount host is a remote host, the method searches the storage array catalog to determine whether the remote host is in any Storage Group. If the remote host belongs to a Storage Group and is also available, the method proceeds with the mount operation. If the remote host does not belong to a Storage Group or is not available, then the method will give out a warning. The method completes the backup operation at 307, and provides a backup status to the user at 308. The backup status may be complete, incomplete, and the percentage of progress (e.g., 50% complete), etc. The method 300A and 300B query the existing index only for the information required for snapshot creation. Results from the queries will be returned faster as no synchronization operation will take place on the storage array. Because storage arrays synchronize with all the components of the storage environment periodically to obtain the most up to date information, and the method returns query results fast enough that no synchronization will take place, the method does not impact on performance of the storage array. The method identifies some of the configuration issues on the storage array before creating any snapshot, and a user will be informed appropriately.

Figure 3C:
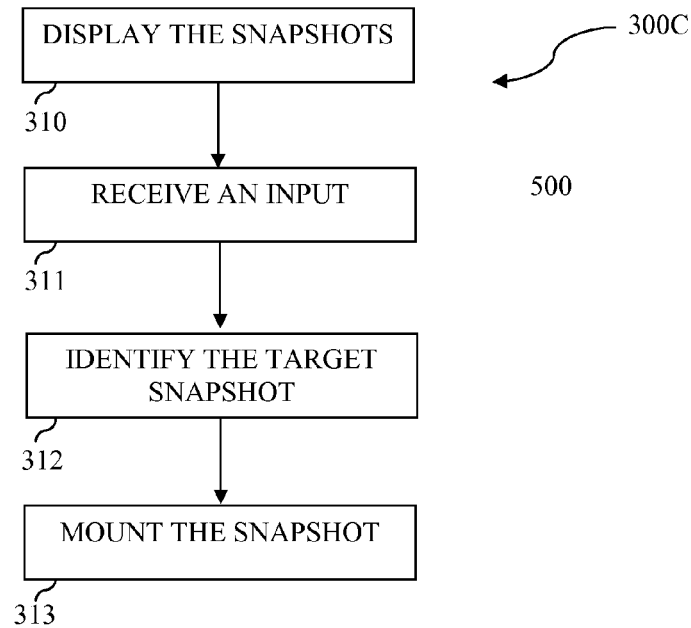
FIG. 3C depicts a flow chart of a method, in accordance with an example embodiment, for cataloging a storage array for restore purposes.

FIG. 3C depicts a flow chart of a method 300C, in accordance with an example embodiment, for cataloging a storage array or device for restore purposes. Restore comprises protected restore, reverse synchronization restore, and volume based restore. At 310, the method displays all the snapshots created for the application database. At 311, the method receives an input that is a selection of a snapshot to be restored from a user. At 312, the method queries all the active snapshots and identifies the target snapshot based on the time and LUN ID given by the recovery application. If the snapshot is a clone based snapshot, then the method queries the Clone Group for the given host and obtains the snapshot information for the given LUN based on the time. At 313, the method mounts the snapshot and performs the restore operation. The restore operation may be performed by using the Storage Array utilities.

Figure 4:
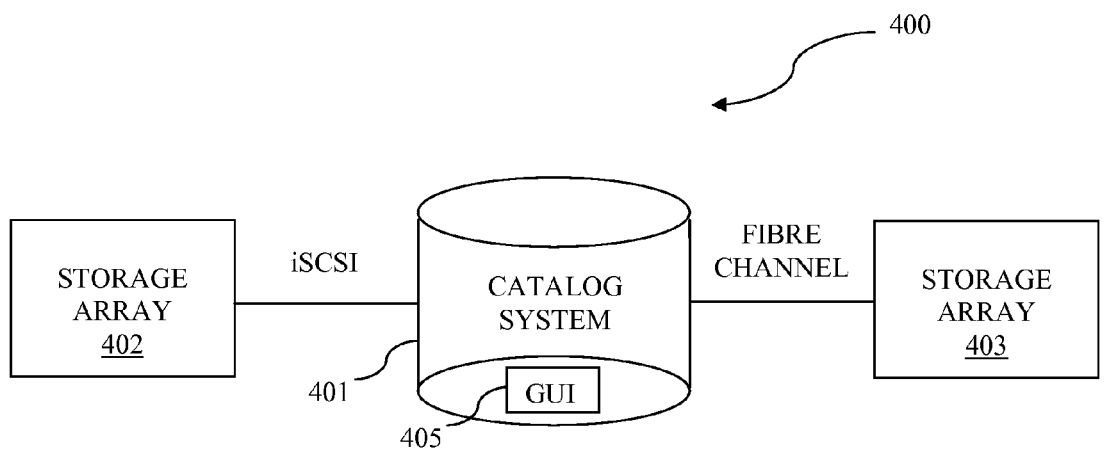
FIG. 4 depicts a diagram of an environment in which a system, in accordance with an example embodiment, for cataloging storage arrays operates.

FIG. 4 depicts a diagram of an environment 400 in which a catalog system 401, in accordance with an example embodiment, for cataloging storage arrays operates. The catalog system 401 creates, updates, and stores indexes for storage arrays 402 and 403. Indexed information created during cataloging comprise all hardware volume, snapshot information on the storage arrays 402 and 403, such as BCV volumes, STD volumes, and clone LUNs, etc. When the catalog system 401 creates snapshots or crafts LUNs on the storage array 402 or 403, all the information regarding the storage array 402 or 403 along with the respective Host information will be stored on the catalog system 401. The catalog system 401 also provides a search facility to search for any particular indexed information quickly. For example, a user can easily search for a particular snapshot, Clone LUN, or hardware volume on the catalog system 401. Further, the catalog system 401 comprises a UI, which may be a java based Graphical User Interface (GUI).

As illustrated in FIG. 4, the catalog system 401 can be Fiber Channel based or iSCSI based. The catalog system 401 can be connected to storage arrays 402 and 403. Also, the catalog system 401 can be accessed and connected through its IP address. During a recovery, meta-data of a storage array can be retrieved from the catalog system 401. For example, if the storage array 402 incurs a disaster and needs recovery, meta-data of the storage array 402 can be fetched from the catalog system 401 instead of being fetched from the storage array 402 itself or a backup storage array 403. The catalog system 401 takes away the load from the storage array 402 or 403 during recovery of the storage array 402. When the catalog system 401 is used for backup recovery of the storage array 402, no other devices are needed for backup recovery. For any backup and recovery of the storage array 402, the storage array 402 may query the catalog system 401 only for the information required for snapshot creation. Results from the catalog system 401 are returned fast enough so that no synchronization operation will take place on the storage array 402; thus, performance of the storage array 402 is not impacted.

In addition, the catalog system 401 can be used in storage array migrations. For example, during a migration from the storage array 402 to the storage array 403, the catalog system 401 which comprises indexes of the storage array 402 can be connected to the storage array 403. All the indexed information created during cataloging of the storage array 402 will be imported to the storage array 403, which completes the migration from the storage array 402 to the storage array 403.

Still referring to FIG. 4, the catalog system 401 can catalog the storage array 402 periodically. The cataloging period can be tunable; however, too frequent cataloging impacts performance of the storage array 402. The catalog system 401 gives out a warning when it is no longer in synchronization with the storage array 402, and may still provide most up-to-date catalog information of the storage array 402. Moreover, the catalog system 401 identifies some of the configuration issues on storage arrays and gives out a warning. For example, when creating a snapshot of an application of the storage array 402, the catalog system 401 searches for available space in Reserved LUN Pool when no Clone Group is configured. The catalog system 401 will inform a user when the available space in Reserved LUN Pool is insufficient or when there is no available space. The catalog system 401 also informs a user when not enough clones are configured on the storage array 402 as per the number of snapshots to be created for the application in a day.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for cataloging storage arrays, comprising:
identifying a storage array having a synchronization operation period, the storage array comprising snapshots, business continuance volumes (BCVs), standard (STD) volumes, clone groups, and storage groups, wherein each clone group comprises a plurality of clone logical unit numbers (LUNs), and each storage group comprises a plurality of source LUNs, and wherein a clone LUN of a clone group is a clone of a source LUN of a storage grow;
conducting a storage discovery on the storage array, wherein conducting the storage discovery comprises creating or updating a configuration database file associated with the storage array;
obtaining a complete storage array information associated with the storage array from the configuration database file;
creating an index comprising a configuration of the storage array or a plurality of configurations of the storage array, wherein the index information comprises the snapshots, the clone logical unit numbers (LUNs), the business continuance volumes (BCVs), the standard (STD) volumes, the clone groups, and the storage groups;
updating the index according to a first frequency; and
updating a second index associated with a second storage array according to a second frequency, different from the first frequency.

2. The method of claim 1, further comprising updating the index periodically.

3. The method of claim 1, wherein the storage discovery is conducted using a Command Line Interface (CLI) of the storage array.

4. The method of claim 1, wherein the configuration database file is a flat file, further comprising parsing the configuration database file.

5. The method of claim 1, wherein the index is a backup application index.

6. The method of claim 5, the conducting the storage discovery on the storage array further comprising identifying a device residing on the storage array, further comprising:
initiating a backup operation;
identifying an application associated with the device, the application being on the storage array;
obtaining a clone group associated with the application, the clone group having a clone group name;
querying a clone on the storage array or a plurality of clones on the storage array using the clone group name;
creating a snapshot using the clone group name; and
storing the snapshot in the backup application index.

7. The method of claim 6, further comprising:
mounting the snapshot;
completing the backup operation; and
providing a status of the backup operation to a first user.

8. The method of claim 6, further comprising:
identifying a configuration issue associated with the application; and
informing a second user of the configuration issue.

9. The method of claim 6, further comprising:
displaying a plurality of snapshots associated with the application database;
receiving an input, the input selecting a target snapshot for restoration;
identifying the target snapshot by querying the plurality of snapshots; and
mounting the snapshot to the device.

10. A computing system for cataloging storage arrays, the computing system comprising:
a processor; and
a memory in communication with the processor, the memory comprising a plurality of instructions executable by the processor, when the plurality of instructions are executed the processor being configured to:
identify a storage array having a synchronization operation period, the storage array comprising snapshots, business continuance volumes (BCVs), standard (STD) volumes, clone groups, and storage groups, wherein each clone group comprises a plurality of clone logical unit numbers (LUNs), and each storage group comprises a plurality of source LUNs, and wherein a clone LUN of a clone group is a clone of a source LUN of a storage group;
conduct a storage discovery on the storage array, wherein the storage discovery comprises creating or updating a configuration database file associated with the storage array;
obtain a complete storage array information associated with the storage array from the configuration database file;
create an index comprising a configuration of the storage array or a plurality of configurations of the storage array, wherein the index information comprises the snapshots, the clone logical unit numbers (LUNs), the business continuance volumes (BCVs), the standard (STD) volumes, the clone groups, and the storage groups;
update the index according to a first frequency; and
update a second index associated with a second storage array according to a second frequency, different from the first frequency.

11. The computing system of claim 10, wherein the computing system is connected to the storage array, and the processor is further configured to:
be accessed and connected through an Internet Protocol (IP) address by a processor of the storage array; and
establish a connection with the processor of the storage array by the processor of the storage array providing a credential of the processor of the storage array to the processor, the credential comprising a username, a password, and a group.

12. The computing system of claim 10, wherein the processor is further configured to update the index periodically.

13. The computing system of claim 10, wherein
the configuration database file is a flat file; and
the processor is further configured to parse the configuration database file.

14. The computing system of claim 10, wherein the index is a backup application index.

15. The computing system of claim 14, wherein the processor is further configured to:
initiate a backup operation;
identify a device residing on the storage array;
identify an application associated with the device, the application being on the storage array;
obtain a clone group associated with the application, the clone group having a clone group name;
query a clone on the storage array or a plurality of clones on the storage array by the clone group name;
create a snapshot using the clone group name; and
store the snapshot in the backup application index.

16. The computing system of claim 15, wherein the processor is further configured to:
mount the snapshot;
complete the backup operation; and
provide a status of the backup operation to a first user.

17. The computing system of claim 15, wherein the processor is further configured to:
identify a configuration issue associated with the application; and
inform a second user of the configuration issue.

18. The computing system of claim 15 having an operation time, wherein the operation time is less than the synchronization operation period of the storage array.

19. The computing system of claim 15, wherein the processor is further configured to:
display a plurality of snapshots associated with the application database;
receive an input, the input identifying a target snapshot for restoration;
identify the target snapshot by querying the plurality of snapshots; and
mount the snapshot to the device.

20. A computer program product for cataloging storage arrays, comprising a non-transitory computer usable medium having machine readable code embodied therein for:
identifying a storage array having a synchronization operation period, the storage array comprising snapshots, business continuance volumes (BCVs), standard (STD) volumes, clone groups, and storage groups, wherein each clone group comprises a plurality of clone logical unit numbers (LUNs), and each storage group comprises a plurality of source LUNs, and wherein a clone LUN of a clone group is a clone of a source LUN of a storage group;
conducting a storage discovery on the storage array, wherein conducting the storage discovery comprises creating or updating a configuration database file associated with the storage array;
obtaining a complete storage array information associated with the storage array from the configuration database file;
creating an index comprising a configuration of the storage array or a plurality of configurations of the storage array, wherein the index information comprises the snapshots, the clone logical unit numbers (LUNs), the business continuance volumes (BCVs), the standard (STD) volumes, the clone groups, and the storage groups;
updating the index according to a first frequency; and
updating a second index associated with a second storage array according to a second frequency, different from the first frequency.

* * * * *